United States Patent
Sumner

[19]

[11] Patent Number: 6,091,947
[45] Date of Patent: Jul. 18, 2000

[54] METHOD AND APPARATUS FOR ACCEPTING AND CONVEYING A VOICE MAIL MESSAGE TO A MOBILE UNIT IN A WIRELESS TELEPHONE SYSTEM

[76] Inventor: Terence Edward Sumner, 2057 Spinnaker La., Azle, Tex. 76020

[21] Appl. No.: 09/042,355

[22] Filed: Mar. 13, 1998

[51] Int. Cl.[7] .............................. H04M 11/10; H04Q 7/20; H04B 17/00
[52] U.S. Cl. ..................... 455/413; 455/445; 455/67.4; 455/414; 455/458
[58] Field of Search .................................. 455/413, 412, 455/414, 421, 424, 425, 445, 67.4, 67.3, 63, 458, 466

[56] References Cited

U.S. PATENT DOCUMENTS

| | | | |
|---|---|---|---|
| 5,361,399 | 11/1994 | Linquist et al. | 455/412 |
| 5,373,548 | 12/1994 | McCarthy | 455/421 |
| 5,471,650 | 11/1995 | Vexler et al. | 455/421 |
| 5,506,888 | 4/1996 | Hayes et al. | 455/445 |
| 5,802,466 | 9/1998 | Gallant et al. | 455/413 |
| 5,867,782 | 2/1999 | Yoon | 455/421 |
| 5,884,160 | 3/1999 | Kanazaki | 455/413 |
| 5,889,839 | 3/1999 | Beyda et al. | 455/413 |
| 5,995,830 | 11/1999 | Amin et al. | 455/413 |
| 6,002,750 | 12/1999 | Ertz | 455/413 |
| 6,006,087 | 12/1999 | Amin | 455/413 |
| 6,014,559 | 1/2000 | Amin | 455/413 |

*Primary Examiner*—Fan Tsang
*Assistant Examiner*—Rafael Perez-Gutierrez

[57] ABSTRACT

A wireless telephone messaging system determines when link performance is inadequate to provide a live connection and re-directs the call to voice mail, preferably informing the caller of estimated delivery time. A mobile handset and base unit determine the rate at which a voice mail message can be delivered. A wireless base unit conveys the accepted voice mail to a mobile handset using a store-and-forward protocol. A voice mail message can preferably be delivered at a rate lower than that at which speech normally has acceptable quality but which is transmissible over the same link having an inadequate performance characteristic for a live connection. A mobile handset stores a conveyed voice mail message for playback by the handset user.

16 Claims, 5 Drawing Sheets

METHOD AND APPARATUS FOR ACCEPTING AND CONVEYING A VOICE MAIL MESSAGE TO A MOBILE UNIT IN A WIRELESS TELEPHONE SYSTEM

FIELD OF THE INVENTION

This invention relates in general to wireless messaging systems, and more specifically to a method and apparatus for accepting and conveying a store-and-forward message to a portable handset from a base unit, such as a cordless telephone, when the handset is otherwise not disposed to receive a normal call.

BACKGROUND OF THE INVENTION

Modern wireless telephone systems can provide a normal voice-grade connection to a vehicular mobile or portable handset through well-known telephony techniques. Wireless telephone systems have typically evolved to incorporate automated answering machine techniques, such as voice-mail, allowing a caller to deposit a message when the mobile unit or handset is out of range of the system. Cordless telephone systems, used primarily in residences, have similarly evolved to incorporate answering machines for deposit of voice messages when a person does not answer the telephone.

Popularly, such commercial and private systems operate by notifying the user that a message has been deposited, such as by an interrupted tone in the handset earpiece or visibly flashing of an annunciator on the handset or base unit Retrieval of the deposited message by the user is, then, either directly through a speaker in the base unit in the cordless phone case or by playback from the voice-mail server through the handset over a normal voice connection in the commercial cellular phone case. Voice-mail systems also can attempt to deliver a message to a specified alternative destination upon deposit or after some pre-determined period of time through well-known store-and-forward messaging techniques. Rudimentary forms of store-and-forward schemes have been employed for delivery of answering machine messages over the switched telephone network by out-dialing another telephone and offering the answering party the voice mail, especially if a passcode is entered.

A limitation of prior art wireless telephone messaging systems has been an inability to discriminate between poor inbound link performance and poor outbound link performance. For normal voice connections symmetric performance is highly desirable and the distinction between outbound performance from the base and inbound performance from the handset is irrelevant, since both must be acceptable for normal voice. Simple delivery of voice mail, however, requires only minimal inbound performance with less than perfect outbound performance. Other limitations of prior art messaging systems include an inability to convey the deposited voice mail to the handset automatically and independently of the user when the handset is once again in-range, or to convey at a rate sustainable by a link unacceptable for normal voice connections, or to defer delivery spreading it during low-traffic periods to increase overall efficiency. Voice mail can only be retrieved in commercial systems by requesting it from the handset after having set up a normal symmetric bandwidth connection and not at all from cordless handsets since retrieval is directly from the base unit. Operations such as these have worked reasonably well for many commercial systems, but do not make efficient use of the inbound spectrum and unnecessarily deplete handset battery-energy to make a symmetric connection. Users, both cellular and cordless, also are denied an additional convenience by not having deposited messages readily available at the handset, even when not sufficiently in-range to receive or place calls.

Thus, what is needed is a method and apparatus for accepting voice mail at a base unit and conveying voice mail to a mobile unit in a wireless telephone system. Preferably, the method and apparatus will not affect the low-latency characteristics of prior art systems, but will make use of high efficiency store-and-forward messaging techniques, adding a significant degree of convenience by making voice mail messages available at the mobile handset without a symmetric bandwidth connection, while economizing battery energy usage for the inbound portion of the link.

SUMMARY OF THE INVENTION

An aspect of the present invention is a method in a wireless telephone system for conveying a voice-mail message to a mobile handset when the handset is not disposed to receive a normal voice call. The method comprises the step of estimating the performance of the link between the handset and the base unit The method further comprises the step of determining whether an acceptable voice connection can be made and if not, at what rate voice-mail message may be transferred to the handset and subsequently routing to call to a voice-mail processing system for depositing of voice mail. The method further comprises substantially delivering a deposited voice mail message in its entirety to the handset when and at a rate supportable by the link between the handset and the base unit. Once stored in the handset the user is alerted and may play back the message as if being received in real time.

Another aspect of the present invention is a mobile handset in a wireless telephone system for receiving voice mail when the handset is not disposed to receive normal voice. The mobile handset comprises a transceiver interface for coupling to a communication transceiver, for example a CDMA transmitter-receiver. The mobile handset further comprises a processing system coupled to the transceiver interface for processing the link error estimating signals and processing store-and-forward voice-mail messages. The processing comprises cooperating with the base unit in estimating the link performance, receiving store-and-forward voice-mail messages to storage and acknowledging as appropriate, and handling voice mail in response to user inputs. The mobile handset further comprises a user interface for presenting to the user notification of voice mail status, playback and control of voice mail, and entry of voice mail management control commands.

Another aspect of the present invention is a base unit for delivering a voice mail message to a mobile handset when the handset is not disposed to receive normal voice calls. The base unit comprises a network interface for coupling to a communication network, such as the public switched telephone network. Callers connect through the network interface when attempting to contact a user of a handset. The base unit further comprises a processing system coupled to the network interface for processing calls, determining link performance, accepting voice mail, and delivering voice mail to a handset through a communication transceiver when and at a rate in accordance with the determined link performance. The processing system comprises a conventional computer system and storage, mass storage for larger systems. A microprocessor with external memory will suffice in smaller systems. The base unit also comprises a transceiver interface coupled to the processing system for delivering the voice-mail messages through a communication transceiver and receiving acknowledgments as appropriate.

DETAILED DESCRIPTION OF THE DRAWINGS

Figure 1:
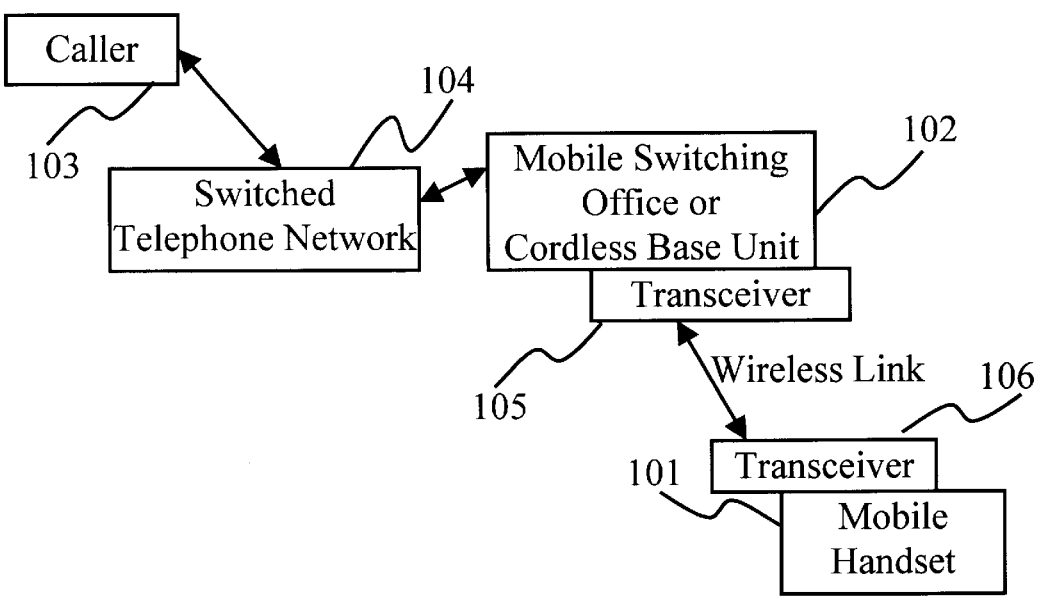
FIG. 1 is an electrical block diagram of a wireless telephone system in accordance with the present invention.

Referring to FIG. 1, an electrical block diagram of a wireless telephone system in accordance with the present invention comprises a caller 103 that provides a voice-mail message through a switched telephone network 104, which connects to a mobile handset 101 via wireless base unit 102. The switched telephone network 104 is preferably the public switched telephone network, but as well could be a private branch exchange telephone switched network, another wireless communication network, a broadband cable network with facility for voice calls, or an Internet-like store-and-forward computer communication system linking by modem and T-1 to host computers suitably equipped to handle voice calls. Preferably, the mobile handsets 101 are similar to spread-spectrum (CDMA) cordless telephone handsets, manufactured by Sony Corporation or using the set of spread-spectrum integrated circuits manufactured by Rockwell Semiconductors, Inc., and having an integral transceiver 106. The cordless base unit 102 similarly is preferably a corresponding spread-spectrum base unit having built-in transceiver 105, such as manufactured by Sony Corporation. Additional control functions and modification to the internal operations of the base unit and handset in accordance with the present invention are necessary and described herein.

Figure 2:
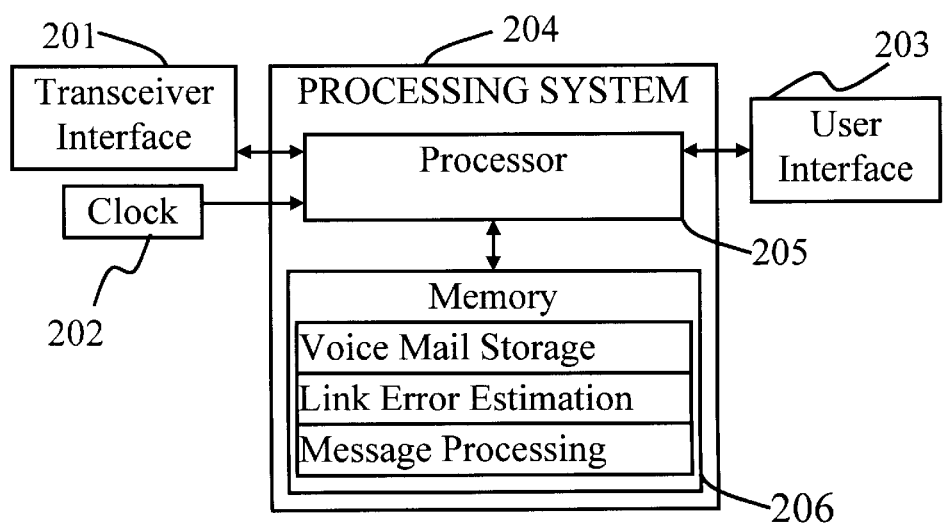
FIG. 2 is an electrical block diagram of a mobile handset in accordance with the present invention.

Referring to FIG. 2, in a mobile handset 101 the processing system 204 comprises preferably a microcomputer processor 205, similar to Rockwell's Skyhawk MC19 embedded 6502 series with a stored programmed in its internal memory. External memory preferably is used for storing the voice-mail messages. The input to the processing system 204 is a transceiver interface 201 and a clock 202. The transceiver interface 201, preferably, is connected to a direct sequence spread spectrum channel transceiver, similar to Rockwell's R900DCTM-3, although the CDMA baseband signal is provided in the Rockwell case from the processing system with embedded controller IC. In store-and-forward computer communication systems the transceiver interface 201 can be connected to a simple TCP-IP stack port, to application level messaging, or to some other identifiable data stream. The processing system 204 is coupled to a user interface 203 of the mobile handset, through which passes controls from the user, such as button presses or commands to initiate playback of voice mail, audio played back to a speaker or ear-piece for user to listen, and signals to annunciate arrival and status of voice mail, such as aural, tactile and visual alarms, and display of priority, length, quality or source of the voice mail. User interface controls specially designated to handle voice mail may be useful as well, such as play message, rewind, next message, and delete message. Replying to and forwarding of voice-mail messages is useful also and can be effected using the same method from handset to base.

The memory 206 provides storage for received voice mail and programming to cooperate in estimating link performance and to process messaging. The memory 206 preferably is divided into read-only memory for the program and read-write memory for the storage of voice mail, although alterable memory can be used for both. The amount of memory required to store voice-mail messages depends upon the form in which it is stored. Typical 8-kilobit per second (kbps) voice coding used in public CDMA systems would consume only one-quarter the storage space of 32-kbps ADPCM used in typical cordless phones. An external one mega-Byte flash RAM could hold a hundred 8-kbps messages of ten seconds each. Adding memory to store the voice mail is a necessary modification to the handset Another useful modification to the cordless system would be to utilize the same voice coding as in public CDMA systems to reduce the storage needed.

Estimating link performance may be done by the handset or the handset may merely pass information back to the base unit to allow it to estimate the performance of the link. The handset may actually calculate a recommended data flow rate out from the base and supply this rate back to the base unit Preferably, the link characteristics determining optimum flow rate are measured and reported by the handset. Primarily, received power level of the outbound signal and underlying noise or interference determine the capacity of the link. Signal power alone can be used to approximate the available received signal in noise and distortion. Detected Rayleigh fading rate and depth, power of interfering signals, and background noise can variously approximate the expected channel performance. These techniques are well known in the art. The preferred technique is to transmit a layered direct-sequence spread spectrum signal simultaneously modulating four different data rates at 8,000, 1,600, 320, and 64 bps. The receiving end then measures the incurred errors at each rate, reporting the highest correctable rate to the transmitting end.

The message-processing program stored in memory 206 preferably is similar to the standard cordless telephone protocol but with modifications. Message processing needs to be able to detect normal voice transmissions and voice-mail messages, routing the data accordingly, and be able to distinguish the correct transmission rate for the voice mail. A cordless phone typically operates in a TDD (Time Division Duplex) mode wherein it alternates between transmitting and receiving. Thus, while the average rate is 8 kbps, in TDD mode the transmitting rate is slightly more than double that to account for receiving plus turnaround times. The normal voice connection is not typically designed for efficiency but rather for effectiveness of the link, i.e. error-free reception without resorting to retransmission. The real-time nature of a normal voice connection demands this perspective. The non-real-time store-and-forward nature of voice mail permits a different design criterion: getting the message efficiently, that is with low overhead but quickly and correctly. Efficiency becomes the primary concern so that the message may be received completely as quickly as possible.

Although at the handset the playback will be at real-time rate, the transmission over the link need not be. The outbound link can bear the bulk of traffic for voice mail with only acknowledgments on the inbound link. Without the time allocated to equal inbound traffic, the normal outbound rate could deliver voice mail nearly twice as fast in TDD systems. In other words, a ten-second message would take less than 5 seconds to transmit. Conversely, the message could be delivered over a four-minute period and then played back in the handset in ten seconds.

Additionally, heavy, high overhead for error control on normal voice to prevent errors from occurring can be replaced by lower overhead ARQ protocols for voice mail. Packet sizes for ARQ protocols vary according to condition, larger packets for stable low-error links, shorter packets for variable or high-error rate links. The proportion of data allocated to information versus error control coding varies according to condition also. Thus, when determining the outbound rate many factors come into play. Those skilled in the art will recognize that many parametric solutions will give similar results, but many will perform poorly also.

The objective in measuring and estimating the performance of the link between the base unit and handset is to determine a rate at which a voice-mail message may be efficiently transmitted. This rate may change over the duration of the transmission and, thus, it may be desirable to alter the transmission accordingly so that most efficient transmission occurs at all times. Therefore, the message processing preferably allows for the voice-mail transmission rate to be set initially by the base unit and the rate to be varied according to measured performance during the outgoing message.

A clock 202 is connected to the processing system 204 to run the processor 205, supplying clocking pulses as well as providing for calendar and time-of-day synchronization, preferably being a part of the microprocessor support circuitry. Time-stamping of messages is a highly desired feature in a system incorporating voice mail, necessitating a calendar and time of day clock with reasonably good accuracy, although stamping of messages only at the base unit works reasonably well.

Figure 3:
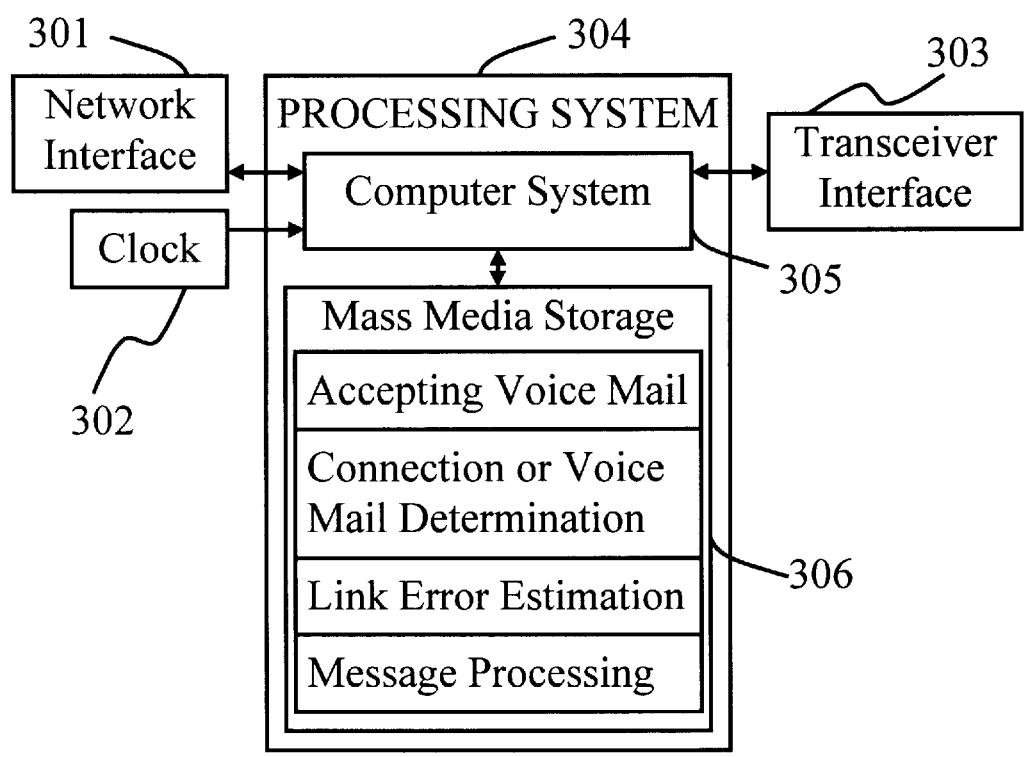
FIG. 3 is an electrical block diagram of a base unit in accordance with the present invention.

Referring to FIG. 3, a base unit 102, being a complementary structure to the mobile handset 101, is depicted. The network interface 301 preferably couples to a standard subscriber telephone line, supplying proper circuit loading, protection, and ring detection. The network connection may be to the public switched telephone network, a private switched telephone network such as a PBX, another wireless telephone system, a wired cable system such as is used for television but shared with voice facility, a wired cable system such as is used to convey electric power but shared with data communication facility, or a computer communication network, such as the Internet or a private local area network having such host computers equipped with voice facility to originate and accept voice calls. Within the concept of voice-mail other forms may be suitably referred to as voice mail even though the message contained therein comprises graphical data, visual data, or aural data. The inability to convey the mail message directly to the wireless mobile unit in such a system that triggers the non-real time store-and-forward delivery method.

A clock 302 is connected to the processing system 304 to run the computer system 305, supplying clocking pulses as well as providing for calendar and time-of-day synchronization, preferably being a part of the computer system 305 itself. Within the processing system 304 are a computer system 305 and mass storage 306. For the cordless telephone case a chipset similar to Rockwell's Skyhawk spread-spectrum cordless phone with additional memory and modified programming is preferred. For the commercial cellular telephone case a workstation computer, such as Sun's Sparc™ series, is preferably the computer system 305, and conventional hard-disc storage is attached to the computer for mass media storage 306.

The transceiver interface 303, as with the handset, preferably connects the digitized voice directly to the CDMA transceiver unless the call is routed to voice mail, in which case voice mail is transmitted over the transceiver and acknowledgments as exist are received over the transceiver. Similar in structure to the mobile handset, the storage 306 holds the voice mail prior to its delivery to the handset, preferably accepting prepared mail messages as well as converting voice calls to voice mail for store-and-forward processing. Programming to process messages, preferably by suitable noise filtering and bandwidth-compression techniques, such as MPEG or G.728, very similar to that for normal voice calls, is kept in storage 306. Conversion of the voice call to voice mail is handled in the same fashion as typical answering machines for depositing the message. However, upon completion the caller can be advised of the estimated time of delivery of the deposited message. Even editing of the message to improve delivery time is possible. Message processing preferably also includes gathering of statistics and other information on the call or the converted voice-mail message for delivery in notification messages, and processing of such notification messages, acknowledgments, and other message control messages, such as forwarding, deleting, refusing, prioritizing and archiving of messages.

Programming to handle estimation of link performance, preferably reported as the link error rate on various data rates, is stored in the processing system storage 306. Determining link error rate comprises generating a test signal to the handset, receiving a report on errors detected by the handset, analyzing the test signal furnished from the handset, calculating error control coding, information rate, packet size, both for inbound and outbound, as appropriate for the conditions, and later monitoring of the system performance using these parameters. Programming to determine the disposition of an incoming call, routing it to the handset directly or routing it to voice mail processing, as dictated by the link performance and user inputs if any, is kept in storage 306 as well. Programming to handle the store-and-forward message processing is included in storage 306 and is different from normal voice connection protocol over the same link.

Higher compression techniques may be used to reduce the bandwidth required for the voice mail in non-real time, but such a compressed file would require a link with a low error rate. A packet protocol with acknowledgments such as HDLC set up for transport over a CDMA link can deliver an appropriately low error rate with low overhead. Thus, the message processing preferably handles both normal voice calls as well as the voice-mail message processing. By choosing packet sizes, error control coding, and proper speed of delivery voice mail messages may be delivered efficiently and with low error rate.

Spread spectrum processing gain plays a role in determining the speed of delivery. An adjustable filter on the transceiver wireless input could be used to reject noise and interference as the data rate is adjusted higher or lower, or preferably the number of chips per symbol of direct sequence spreading could be adjusted higher or lower maintaining a constant bandwidth regardless of the voice mail delivery rate. Similarly, modulation could be changed from FM to AM or, in the case of FSK-FM, modulation index, beta, could be adjusted with changing link performance to trade time-bandwidth for power. Alternatively, if permitted within regulations, transmitter power level could be adjusted directly to compensate for link performance, using only enough power to provide a useful link.

Figure 4:
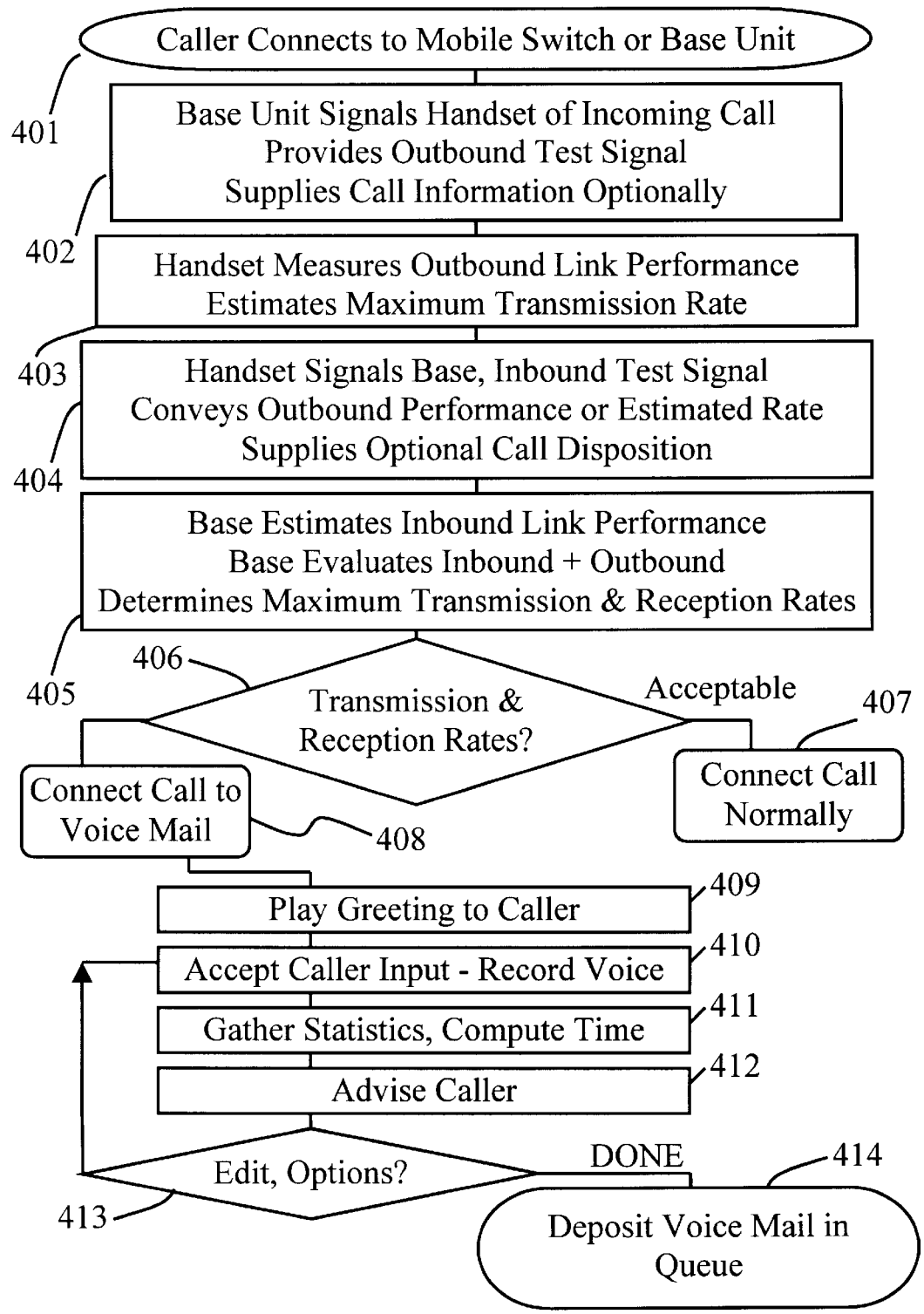
FIG. 4 is part of a system flow chart of routing a call to voice mail in a wireless voice-mail messaging system in accordance with the present invention.

Referring to FIG. 4, a system flow chart describes the operations as they occur in the system in determining whether to route a call to voice mail. A caller starts the process in step 401 by placing a call from a telephone, which call is intended to connect to the user at a handset. Upon identification of the destination handset, the base unit signals the handset to start determination of the outbound link error performance in step 402. When an expectation exists that the link performance has not changed, such as in a fixed application or when the link was very recently used, the outbound test signal may be abbreviated. Conveniently, the base unit may also signal the handset with some information about the call, such as identification of the caller if supplied from the network, e.g. CLI, legitimized identity as determined in the base unit from matching the identity with a legitimization code entered by the caller, priority of the call if so marked, length of call if known, and so on.

In step 403 the handset receives the test signal in the outbound signal. Four possible conditions may exist at the time of the outbound signal: the handset is within normal voice range, the handset is only in range of low-speed connections appropriate for voice mail, the handset is out of range for even voice mail but very low speed data such as a notification might be sent in reasonable time, or the handset is out of range of the base unit even for very low-speed connections. In the first three conditions the handset will reply to the base unit indicating the condition of the outbound portion of the link. Assuming that the handset receives the test signal, in step 404 a reply is composed by the handset. If the handset does not reply, then the base unit will effectively skip around step 404 and evaluate the outbound performance in step 405 as unusable. If call disposition input has been gathered at the handset, for example, based on user input to a displayed caller ID or a low-battery level, such input may be conveyed inbound at the same time as the test signal for the inbound portion of the link in step 404.

In step 405 base unit estimates the inbound link performance so that it may determine which link direction, inbound or outbound, is the constraint It is unlikely that inbound will be the limiting factor, since only acknowledgments are needed in voice mail, but for normal voice connections it likely could be. Whether the handset actually recommends an outbound transfer rate or merely reports measured performance, the base unit preferably determines outbound rate. For commercial systems this is necessary to allow the simultaneous use of the communication channel by more than one user. Since a user would be unaware of channel capacity demand beyond his own call, only the mobile switching office controller can determine the proper loading on the channel, including outbound power and rate for the voice or voice mail connection. Provided, in step 406, that both inbound and outbound performance characteristics are satisfactory, the call may be completed as a normal voice connection in process step 407. If the transmission and reception rates cannot accommodate a normal voice connection, then the call is routed to the voice mail deposit process step 408.

A typical voice mail deposit process is described in steps 409 through 414. In step 409 a greeting is played from storage to advise the caller that the user's handset is out of normal range and a voice mail message may be sent. In step 410 caller input is accepted, for example, recording the voice message. When an end to the voice message is detected, statistics, including length of the message, are gathered in step 411 and the expected delivery time is calculated using estimates from step 405. The caller is advised of delivery time in step 412 and offered the opportunity to edit the message and make some delivery options, such as marking it urgent In step 413 the decision to edit leads back to the capture caller input or to end the process in step 414 by depositing the voice mail in the delivery queue. Caller input can also include entering a passcode so that the base unit recognizes the caller allowing certain functions not permitted to unrecognized callers.

Figure 5:
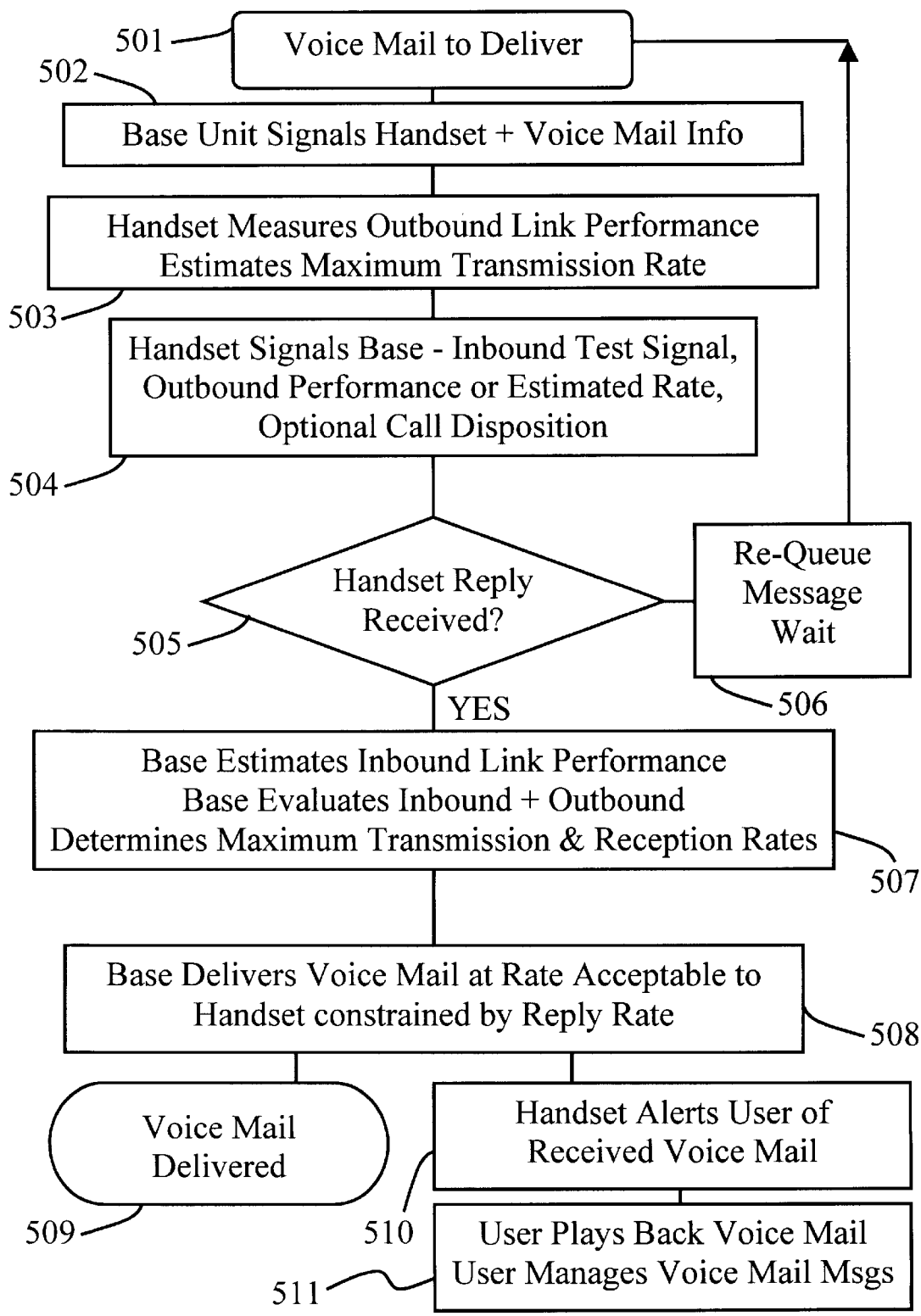
FIG. 5 is part of a system flow chart of delivering voice mail messages in a wireless voice-mail messaging system in accordance with the present invention.

Referring to FIG. 5, voice-mail delivery part of a system flow chart describes the steps subsequent to accepting voice mail, resulting from process step 408, begins when voice mail is detected to be present in queue for delivery in step 501. In step 502 the base unit signals the handset as in step 402 to test the link and optionally supply voice mail information, such as length, time-stamp, priority. The handset measures the test signal in step 503 as in step 403. The test signal in 503 can be abridged if the 402 test signal was stable and recent Again as in step 404, the handset signals the base unit in step 504 with an inbound test signal, response to the outbound test signal with optional disposition information. Likewise, the inbound testing may be abbreviated if the 404 test was stable and recent A decision is made in step 505, if the handset reply is not received, to re-queue the message for delivery and wait an appropriate period of time as shown in step 506. Appropriate delay varies by the circumstances. A low battery condition may not change much in a few minutes. Error rate might change rapidly. Priority messages need to be listened to quickly. Notification at extremely low speed may be an appropriate response to a high priority message stuck in queue. In step 507, based on the voice mail information supplied, the user may dispose of the call by forcing it to archive and not have it delivered to the handset. Otherwise, in step 507 the base unit evaluates the inbound and outbound performance and determines suitable transmission and reception rates and other transmission parameters, similar to step 405. The base then proceeds to deliver according to determined rates, but monitors performance during this delivery adjusting upwards and downwards as needed. Additionally, since some time may elapse from voice mail's being deposited, other voice mail may arrive. As a result, priorities of enqueued messages preferably are checked and delivery order altered accordingly. Notification messages about messages in queue will help the user understand the status of the queue and manage it appropriately, especially if messages are delivered out of order. Furthermore, notification messages will prevent user from turning off the handset while messages are being delivered. Hence, notifications are preferably delivered at time of voice calls and voice mail deposits, and non-destructively interrupt the delivery of voice mail in progress.

Once voice mail messages have been completely delivered or disposed of in step 509, the delivery phase is completed. The user is alerted by the handset in step 510 of the presence of a voice mail message when it is completely received. In step 511 the user may listen to the playback of the message at will from his handset Additionally, the user may respond, forward, archive (save), or delete the message. The caller may have embedded commands within the voice mail such that the user can simply press a button to agree with a proposal, press some buttons to reply to a posed question from a list of choices or to supply a requested number, such as a time for a meeting, or even respond with voice in a non-real time fashion much like the voice mail itself.

Figure 6:
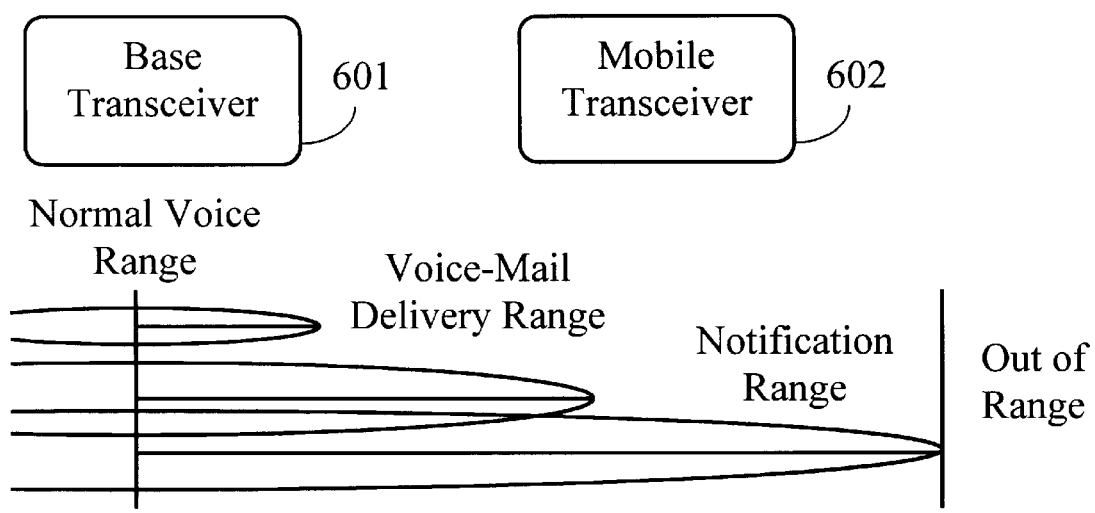
FIG. 6 is a diagram typifying the range of usage of a wireless voice-mail messaging system in accordance with the present invention.

Referring to FIG. 6, a diagram of typical ranges for normal voice, voice mail messaging, and notifications is depicted. The normal voice range may be only a few hundred meters in radius. Voice mail, being tens of kilobits in size, is appropriately delivered in a range several times the radius of normal voice with increasingly longer times for larger messages and rapidly increasingly longer times for further distances. At some distance only notifications are practical. Beyond the range of notifications communication is assumed absent. Notifications can be as simple as a single bit to alert the user or as elaborate as the statistical information described previously about the voice mail messages. Hence, a simple beep to alert the user can be conveyed many miles even from a cordless phone, while a fifty-character notice may be reasonably limited to only a dozen miles.

It will further be appreciated that while the system method and apparatus described could also be used for delivery of messages other than voice mail, the particular desirable characteristics for conveying voice mail when the mobile handset is beyond the normal real-time voice communication range are well matched to the invention. While the preferred embodiment utilizes a direct sequence spread spectrum communication channel, because of its known processing gain characteristic for trading time and bandwidth, other channel types may be utilized. The invention is described in terms of connection to the public switched telephone network, but other networks, such as private or premises switching exchanges, local area networks, and larger shared bandwidth networks with voice facilities, can used to great advantage.

These and other variations will occur to one of ordinary skill in the art, and are not deemed to depart from the scope of the claimed invention.

Thus, it should be clear from the preceding disclosure that the present invention provides a method and apparatus for conveying a voice-mail message to a handset in a wireless telephone system. Advantageously, the method and apparatus retains the low latency and error characteristics of prior art wireless telephone and automated messaging-taking techniques, while adding a significant degree of convenience by conveying deposited voice mail to the mobile handset at a rate supportable by the link connecting the base unit with the handset so that voice-mail messages are available at the handset even when normal voice communication cannot be supported.

Many modifications and variations of the present invention are possible in light of the above teachings. Thus, it is to be understood that, within the scope of the appended claims, the invention can be practiced other than as described herein above.

What is claimed is:

1. A method in a wireless telephone system for conveying a voice-mail message from a voice-mail messaging base unit to a voice-mail messaging handset, the method comprising the steps of:
   detecting a call at the base unit destined for the handset;
   estimating the performance of the outbound and inbound link between the base transceiver and the handset transceiver;
   determining to route the call to a voice-mail process if the performance of the link is unsuitable for normal voice connection; and
   conveying to the handset the processed voice-mail message in a manner suited to the performance estimated for the link.

2. The voice mail messaging method of claim 1, wherein:
   the conveying step further comprises a continuous monitoring of the link performance and adjusting of the manner of delivery suited to the changing performance of the link.

3. The voice mail messaging method of claim 1, wherein:
   the detecting step comprises sensing ringing current on a public switched telephone line.

4. The voice mail messaging method of claim 1, wherein:
   the estimating step includes at least one of:
   measuring the average signal power during a test signal,
   measuring the frequency and intensity of fading from an average of a test signal,
   measuring the degree of distortion and noise present in a test signal,
   measuring the delay from a standard time to an average of a test signal,
   measuring the proportion of errors in a digital test signal,
   measuring the number and location of detected errors in a digital test signal, and
   determining the received test signal with best throughput from a plurality of measured test signals.

5. The voice mail messaging method of claim 1, wherein:
   the determining step further includes user input to force the determination of routing the call to be routed to voice mail if the user so desires.

6. The voice mail messaging method of claim 1, wherein:
   the determining step comprises comparing link performance to a pre-determined quality standard and routing the call to voice mail processing if an estimated performance will not meet the standard.

7. The voice mail messaging method of claim 1, wherein:
   the conveying step comprises forming the message into a plurality of packets, each packet being protected by error control coding, and transmitting packets to the handset as many times as required to achieve acceptable error performance.

8. The voice mail messaging method of claim 1, wherein:
   the conveying step comprises forming the message into a plurality of packets, each packet being protected by error control coding, transmitting packets to the handset, transmitting an acknowledgment from the handset either positively acknowledging an acceptably received packet or negatively acknowledging unacceptably received packet or both, and retransmitting a packet to the handset as many times as required to achieve acceptable error performance,
   wherein the conveying step further comprises monitoring and adjusting the manner of delivery, wherein the adjusting step includes at least one of:
   changing the length of packet,
   changing the length of error control coding for a packet,
   changing the rate of delivery of data,
   changing the interleaving pattern of data packets,
   changing the transmitting power level,
   changing the bandwidth occupied by the transmitted packet,
   changing the modulating technique for the packet,
   changing the spreading code for the packet,
   changing the directivity of a radiator, and
   changing the directivity of a receptor.

9. A wireless voice-mail messaging base unit comprising:
   a network interface for coupling to a communication network;

a processing system coupled to the network interface for processing voice mail, wherein the processing system is programmed for cooperating in estimating performance of a communication link with a handset, for accepting voice-mail messages for delivery to a handset, and for delivering voice-mail messages in accordance with an estimated link performance; and a transceiver interface coupled to the processing system for coupling to a communication channel providing a link to a handset.

10. The wireless voice-mail messaging base unit of claim 9, wherein:

the network interface is coupled to a computer communication network.

11. The wireless voice-mail messaging base unit of claim 9, wherein:

the network interface is coupled to a switched telephone network.

12. The wireless voice-mail messaging base unit of claim 9, wherein:

the network interface is coupled to a wireless network.

13. The wireless voice-mail messaging base unit of claim 9, wherein:

the network interface is coupled to a network of cables.

14. The wireless voice-mail messaging base unit of claim 9, wherein:

the transceiver interface is coupled to a code-division multiple access communication channel.

15. A wireless voice-mail messaging handset comprising:

a transceiver interface for coupling to a communication channel providing a link to a base unit;

a processing system coupled to the transceiver interface for processing voice mail, wherein the processing system is programmed for cooperating in estimating performance of a communication link with a base unit, for receiving a voice-mail message in accordance with an estimated link performance, and for storage and processing of voice-mail; and a user interface coupled to the processing system for presenting voice mail to a user, providing notification to a user, and user control over a voice-mail message.

16. The wireless voice-mail messaging handset of claim 15, wherein:

the transceiver interface is coupled to a code-division multiple access communication channel.

* * * * *